United States Patent [19]

Ogata et al.

[11] Patent Number: 4,832,800

[45] Date of Patent: * May 23, 1989

[54] PROCESS FOR PREPARING SURFACE-TREATED STEEL STRIPS ADAPTED FOR ELECTRIC RESISTANCE WELDING

[76] Inventors: Hajime Ogata; Hisatada Nakakouji; Kyoko Hamahara; Kazuo Mochizuki; Toshio Ichida, all of c/o Research Laboratories of Kawasaki Steel Corporation 1, Kawasaki-cho, Chiba-shi, Chiba, Japan

[ * ] Notice: The portion of the term of this patent subsequent to Dec. 31, 2002 has been disclaimed.

[21] Appl. No.: 59,217

[22] Filed: Jun. 8, 1987

Related U.S. Application Data

[63] Continuation of Ser. No. 741,294, Jun. 4, 1985, abandoned.

[30] Foreign Application Priority Data

Jun. 4, 1984 [JP] Japan ................................ 59-114266

[51] Int. Cl.$^4$ ......................... C25D 7/06; C25D 11/38
[52] U.S. Cl. ..................................... 204/28; 204/373; 204/41
[58] Field of Search ..................... 204/27, 28, 37.3, 40, 204/41

[56] References Cited

U.S. PATENT DOCUMENTS 4,561,943 12/1985 Mochizuki et al. ................... 204/28

FOREIGN PATENT DOCUMENTS 60-17099 1/1985 Japan .
60-29477 2/1985 Japan .
60-114596 6/1985 Japan .

Primary Examiner—John F. Niebling
Assistant Examiner—William T. Leader

[57] ABSTRACT

A surface-treated steel strip adapted for electric resistance welding is prepared by forming a first layer of iron-nickel alloy on a steel strip, said first layer having a weight ratio of Ni/(Fe+Ni) in the range between 0.02 and 0.50 and a thickness of 10 to 5,000 angstroms, forming a second layer of tin or iron-tin-nickel alloy on said first layer by tin plating to a coating weight of 0.1 to 1 g/m$^2$ of tin and optionally, causing the tin to reflow, and forming a third layer on said second layer by effecting an electrolytic chromate treatment, said third layer consisting essentially of metallic chromium and hydrated chromium oxide, wherein the electrolytic chromate treatment is carried out in a bath which contains an amount of a chromate compound to give 10 to 100 g/l of CrO$_3$ and has a weight ratio of H$_2$SO$_4$/CrO$_3$ in the range between 3/1000 and 1/100.

2 Claims, No Drawings

PROCESS FOR PREPARING SURFACE-TREATED STEEL STRIPS ADAPTED FOR ELECTRIC RESISTANCE WELDING

This application is a continuation of application Ser. No. 741,294, filed June 4, 1985 now abandoned.

BACKGROUND OF THE INVENTION

This invention relates to a process for preparing surface-treated steel strips adapted for electric resistance welding, and more particularly, to a process for preparing surface-treated steel strips having such improved weldability as to permit can bodies to be joined into food cans by electric resistance welding as well as improved corrosion resistance after lacquer coating.

Among food can-forming materials there have been most widely used tin-coated steel strips generally called tin plates. In order to join the mating edges of a can body, conventional soldering techniques were previously used. Because of the toxicity of lead contained in conventional solder, pure tin solder has recently become prevalent. The pure tin solder, however, has a technical problem in making a joint because of inferior wettability during the soldering process and is so expensive as to create the economic problem of increased manufacture cost.

On the other hand, in recent years, food containers have enjoyed the development of inexpensive, competitive materials such as polyethylene, aluminum, glass, processed paper and the like. Despite their significantly improved corrosion resistance among other advantages, tin plate cans having expensive tin thickly coated thereon to a coating weight of as great as 2.8 to 11.2 g/m$^2$ require a relatively high cost of manufacture and have encountered severe competition.

In order to overcome the above-described drawbacks of tinplate cans, electric resistance welding of can bodies has recently replaced the conventional soldering technique and become widespread. There is the need for can-forming steel compatible with electric resistance welding.

In addition to tinplate discussed above, tin-free steel of chromium type is another typical example of conventional can-forming steel. The tin-free steel is prepared by carrying out an electrolytic chromate treatment on steel to form a layer of metallic chromium and hydrated chromium oxides on the surface. Since the relatively thick hydrated chromium oxide film on the surface has a relatively high electric resistance, the chromated steel is ineffectively welded to form a weld of insufficient strength and thus unsuitable as welded can-forming steel despite its economic advantage.

Since other can-forming materials are also inadequate as welded can-forming material, a variety of proposals have been made. One example is nickel-plated steel, typically "Nickel-Lite" announced by National Steel Corporation of the U.S. which is prepared by plating a steel strip with nickel to a thickness of about 0.5 g/m$^2$ followed by a conventional chromate treatment. Inferior adhesion of lacquer has limited the spread of this nickel-plated steel.

Another example is "Tin Alloy" announced by Jones & Laughlin Steel Corporation of U.S. This is prepared by thinly coating a steel strip with tin to a thickness of about 0.6 g/m$^2$ and effecting tin fusion or reflow followed by a conventional chromate treatment. Unfortunately, rust resistance and lacquer adhesion are insufficient.

In general, can-forming steel sheets intended for electric resistance welding are required to exhibit improved weldability and corrosion resistance after lacquering. These requirements will be explained in detail. There must be a proper welding electric current range within which a weld zone having sufficient weld strength is provided at the end of welding without any weld defects such as so-called "splashes". Since welded cans are filled with foodstuffs after lacquer coating, the underlying steel must have sufficient adhesion to lacquer to take full advantage of the corrosion prevention of the lacquer film. Furthermore, despite defects unavoidably occurring in a lacquer film, the improved corrosion resistance of the underlying steel itself prevents corrosion from proceeding.

The inventors previously proposed in Japanese Patent Application Nos. 58-124235 and 58-222372 a process for preparing a thinly tin-coated steel strip capable of satisfying both weldability and corrosion resistance after lacquering. These applications are directed to a process for preparing a surface-treated steel strip adapted for electric resistance welding, comprising the steps of forming a first layer of iron-nickel alloy on a steel strip, the first layer having a weight ratio of Ni/(Fe+Ni) in the range between 0.02 and 0.50 and a thickness of 10 to 5,000 angstroms; forming a second layer of tin or iron-tin-nickel alloy on the first layer by tin plating to a coating weight of 0.1 to 1 g/m$^2$ of tin and optionally, causing the tin to reflow; and forming a third layer on the second layer by effecting an electrolytic chromate treatment. The third layer consists essentially of metallic chromium and hydrated chromium oxide in a total amount of 5 to 20 mg/m$^2$ calculated as elemental chromium. The electrolytic chromate treatment is controlled such that the following relationships:

$$2 \leq X \text{ and}$$

$$5 \leq X+Y \leq 20$$

are met provided that X represents the amount of metallic chromium in the third layer and Y represents the amount of hydrated chromium oxide in the third layer calculated as elemental chromium, both expressed in mg per square meter. These processes are successful to a substantial extent in producing thinly tinned steel strips having improved weldability and corrosion resistance.

SUMMARY OF THE INVENTION

It is therefore, an object of the present invention to provide a further improved process for preparing a surface-treated steel strip suitable for electric resistance welding which can yield a chromate layer having the desired composition and offering improved corrosion resistance.

The present invention is based on the discovery that improved corrosion resistance is obtained by properly controlling the composition of the chromate treating bath.

According to the present invention, there is provided a process for preparing a surface-treated steel strip adapted for electric resistance welding, comprising the steps of forming a first layer of iron-nickel alloy on a steel strip, said first layer having a weight ratio of Ni/(-

Fe+Ni) in the range between 0.02 and 0.50 and a thickness of 10 to 5,000 angstroms, forming a second layer of tin or iron-tin-nickel alloy on said first layer by tin plating to a coating weight of 0.1 to 1 g/m² of tin and optionally, causing the tin to reflow, and forming a third layer on said second layer by effecting an electrolytic chromate treatment, said third layer consisting essentially of metallic chromium and hydrated chromium oxide, wherein the electrolytic chromate treatment is carried out in a bath which contains an amount of a chromate compound to give 10 to 100 g/l of $CrO_3$ and has a weight ratio of $H_2SO_4/CrO_3$ in the range between 3/1000 and 1/100.

The control of the chromate treating bath composition allows for stable formation of a chromate coating, thereby producing an electrically weldable, surface-treated steel strip having improved corrosion resistance after lacquering.

The inventors disclosed in the preceding applications that the amount of metallic chromium X in mg/m² and the amount of hydrated chromium oxide Y in mg/m² in the third layer or chromate layer should preferably be $2 \leq X$ and $5 \leq X+Y \leq 20$. This process has been found successful to a certain extent in producing thinly tinned steel exhibiting favorable weldability and corrosion resistance after lacquering. Our subsequent investigation has revealed that the chromate coating cannot always be obtained in a desired quantity depending on the composition of the chromate treating bath, particularly the concentrations of $CrO_3$ and $H_2SO_4$, and that some chromate coatings, even when they are produced in a desired quantity, might become less satisfactory in corrosion resistance after lacquering or in appearance.

The reason for limiting the composition of the chromate treating bath to the above specified range will be described in detail.

The chromate treating bath used in the practice of the present invention must contain a major proportion of a chromate compound and a minor proportion of sulfuric acid or salts or derivatives thereof in water. The chromate compound may be selected from chromic anhydride, metal chromates and metal dichromates, for example, $Na_2Cr_2O_7$. Any sulfate anion producing compounds may be used, for example, sulfuric acid and sodium sulfate.

If the $CrO_3$ concentration exceeds 100 g/l, the loss of $CrO_3$ entrained with the exiting steel strip becomes increased and the underlying metallic Sn layer can be etched with $CrO_3$ to deteriorate the appearance. Lower $CrO_3$ concentrations below 10 g/l are not economical because of a ramp of bath voltage accompanied by increased power consumption. For this reason, the concentration of $CrO_3$ in the chromate treating bath should fall within the range of 10 g/l to 100 g/l, and more preferably 10 g/l to 60 g/l.

The concentration of $H_2SO_4$ is discussed in terms of the weight ratio of $H_2SO_4/CrO_3$. Chromate coatings formed at $H_2SO_4/CrO_3$ ratios in excess of 1/100 exhibit inferior corrosion resistance after lacquering despite the formation of metallic chromium and hydrated chromium oxide in the desired quantities. Although the exact reason is not clear, it is presumed that chromium oxide coatings tend to become non-uniform at such higher ratios. At weight ratios of $H_2SO_4/CrO_3$ of lower than 3/1000, it is difficult to produce a chromate coating in the desired quantity. When it is intended to produce the required quantity of metallic chromium, hydrated chromium oxides are also produced in an increased quantity so that the total quantity of metallic chromium and hydrated chromium oxide exceeds 20 mg/m², resulting in deteriorated weldability. An extra quantity of hydrated chromium oxides may be dissolved away by any process, for example, by immersing in a high concentration $CrO_3$ solution, to thereby reduce the quantities of metallic chromium and hydrated chromium oxides to the desired level. In fact, improved weldability and corrosion resistance can be obtained by reducing the chromate coating to the desired quantity by this dissolving-away technique insofar as the chromate treating bath has an otherwise proper composition.

However, the adjustment based on the dissolving-away technique is rather difficult particularly when the $H_2SO_4/CrO_3$ ratio is lower than 3/1000. For this reason, the weight ratio of $H_2SO_4/CrO_3$ should fall within the range between 3/1000 and 10/1000, and more preferably 5/1000 and 9/1000.

Examples of the present invention are given by way of illustration and not by way of limitation.

EXAMPLES

A conventional steel strip intended for electroplating was cold rolled to a thickness of 0.2 mm and electrolytically cleaned in a usual manner before it was cut into samples designated Nos. 1 to 11. Surface-treated steel samples were prepared from these steel samples by the process according to the present invention (sample Nos. 1–5) and by similar processes in which at least one parameter did not fulfill the requirements of the present invention (sample Nos. 6–11). The samples were then tested for weldability and corrosion resistance after lacquering.

I. Formation of the first layer of iron-nickel alloy

The first layer of iron-nickel alloy was formed on steel samples by one or a combination of two or more of the following procedures:
 (a) nickel plating followed by annealing,
 (b) plating of an iron-nickel alloy followed by annealing, and
 (c) plating of an iron-nickel alloy.

For instance, a steel strip was cold rolled to a thickness of 0.2 mm and electrolytically cleaned in a sodium hydroxide solution. The steel strip was then plated with nickel or an iron-nickel alloy and annealed in an atmosphere of 10% $H_2$ + 90% $N_2$, that is, the so-called HNX gas atmosphere. The thus annealed strip was further electrolytically cleaned in a caustic soda solution, pickled in a sulfuric acid solution, and then plated with an iron-nickel alloy. Typical examples of the plating baths used had the following compositions.

| | |
|---|---|
| (a) Nickel plating bath | |
| Nickel sulfate | 250 g/l |
| Nickel chloride | 45 g/l |
| Boric acid | 30 g/l |
| (b) Iron-nickel alloy plating bath | |
| Iron chloride | 20–230 g/l |
| Nickel chloride | 30–300 g/l |
| Boric acid | 25 g/l |

A first layer of iron-nickel alloy was formed on the surface of a steel strip in this way. For sample Nos. 1 to 5 according to the present invention, the first layers formed had a weight ratio of Ni/(Fe+Ni) in the range between 0.02 and 0.50 and a thickness of 10 to 5,000 Å as shown in Table 1, satisfying the requirements of the invention. Among samples for comparison purpose, sample No. 9 had a weight ratio of Ni/(Fe+Ni) of 0.01, not satisfying the requirement of the invention.

It is to be noted that the composition and thickness of the first layer of iron-nickel alloy shown in Table 1 were measured by IMMA.

II. Formation of the second layer

Tin is deposited on the first layer to form a second layer of tin thereon. Optionally, tin plating is followed by a tin fusion or reflow treatment to form a second layer of iron-tin-nickel alloy on the first layer. The tin reflowing is not necessarily needed because conversion into such an alloy layer will take place during subsequent baking of lacquer. The corrosion resistance after lacquering is the corrosion resistance of steel at the end of lacquering, that is, at the end of lacquer baking. For this reason, the previous tin reflowing is not necessarily needed. A significant improvement in corrosion resistance is achievable when the second layer is formed simply by tin plating without reflowing and a corresponding alloy layer is subsequently formed during baking of lacquer. A typical example of the tin plating bath used is a halide bath having the following composition:

| Tin-plating halide bath | |
|---|---|
| Stannous chloride | 60 g/l |
| Acidic sodium fluoride | 20 g/l |
| Sodium fluoride | 50 g/l |
| Sodium chloride | 60 g/l |

In this step, sample Nos. 1 to 5 according to the present invention had tin plated to a coating weight in the range of 0.1 to 1 g/m$^2$, i.e., 100–1,000 mg/m$^2$, satisfying the requirement of the invention. Among samples for comparison purpose, sample No. 8 had tin plated to a coating weight as little as 50 mg/m$^2$ and sample No. 12 had tin plated to as much as 2,800 mg/m$^2$, not satisfying the requirement of the invention. It is to be noted that sample No. 12 having tin thickly coated corresponds to #25 tinplate which is the most thinly coated tinplate among currently available tinplates.

III. Formation of the third layer of metallic chromium and hydrated chromium oxide by electrolytic chromate treatment The tin-plated steel samples were subjected to cathodic electrolysis in a chromate treating bath.

The chromate treating bath used in the cathodic electrolysis contains a major amount of CrO$_3$ and a minor amount of sulfate anion SO$_4^-$, for example, H$_2$SO$_4$ and Na$_2$SO$_4$.

CrO$_3$ is interchangeable with hexavalent chromium afforded by Na$_2$Cr$_2$O$_7$, for example. No difference arises in properties as long as such salts afford an equal quantity of hexavalent chromium. The hexavalent chromium-producing compound and sulfate anion-producing compound are expressed as CrO$_3$ and H$_2$SO$_4$ regardless of the compounds actually used.

When necessary, an excess of hydrated chromium oxides was dissolved away using high concentration CrO$_3$ in water such that the amount of metallic chromium X (mg/m$^2$) and the amount of hydrated chromium oxides Y (mg/m$^2$) might fall within the range given by $2 \leq X$ and $5 \leq X+Y \leq 20$.

The compositions of the electrolytic chromate treating baths used for sample Nos. 1 to 5 satisfied the requirements of the present invention that the CrO$_3$ concentration ranges from 10 to 100 g/l and H$_2$SO$_4$/CrO$_3$ weight ratio ranges from 3/1000 to 10/1000. Among samples for comparison purpose, sample No. 6 had a too low H$_2$SO$_4$/CrO$_3$ weight ratio of 2/1000, sample No. 7 had a too high H$_2$SO$_4$/CrO$_3$ weight ratio of 12/1000, and sample No. 11 had a too high CrO$_3$ concentration of 150 g/l, all falling outside the scope of the present invention.

Test specimens were cut from the thus obtained samples to examine their properties.

Weldability and corrosion resistance after lacquer coating were evaluated as follows.

Weldability

A copper wire having a diameter of about 1.5 mm was used as a welding electrode. A specimen was rounded to place one edge on the mating edge under pressure. While the copper wire was moved along the overlapping edge, electric resistance welding was conducted at a welding rate of 40 m per minute. Optimum ranges for electric current and pressure applied during welding were sought within which a weld zone having sufficient strength could be produced without so-called splashes. The presence of these ranges ensures the weldability of specimens.

The strength of a weld zone was determined by the so-called peel test in which a V-shaped notch was cut in one end of the rounded specimen across the weld line. The bevelled portion of the overlapping edge was pulled with a pliers toward the other end. The strength required is such that the specimen may not be fractured at the weld in this process.

Corrosion Resistance After Lacquering

A specimen was coated with an epoxy-phenol lacquer to a thickness of 50 mg/dm$^2$ and cross-cuts were formed through the lacquer film to the underlying steel substrate. The specimen was drawn by 5 mm through an Erichsen machine, and then sealed at its edges and rear surface.

The specimen was evaluated for corrosion resistance by immersing it in a deaerated solution of 1.5% citric acid and 1.5% salt at pH 3.0 and 55° C. for one week. The specimen was comprehensively evaluated for corrosion at the location of cross-cuts.

The results of evaluation on welded specimens and lacquer coated specimens originating from sample Nos. 1 to 12 are shown in Table 1.

TABLE 1

| Sample No. | Iron-nickel alloy layer | | Tin weight (g/m$^2$) | Tin reflow | Electrolytic chromate treatment | | |
|---|---|---|---|---|---|---|---|
| | Process | Ni/Fe + Ni | Thickness (Å) | | | CrO$_3$ (g/l) | H$_2$SO$_4$/CrO$_3$ | Bath temp. (°C.) |
| 1 | A | 0.02–0.3 | 1500 | 0.55 | no | 50 | 95/10000 | 50 |
| 2 | A | 0.02–0.4 | 2000 | 0.80 | yes | 15 | 80/10000 | 40 |
| 3 | B | 0.02–0.2 | 300 | 0.70 | yes | 30 | 60/10000 | 45 |

TABLE 1-continued

| Sample No. | | | | | | | | | |
|---|---|---|---|---|---|---|---|---|---|
| 4 | A | 0.02–0.1 | 50 | 0.60 | no | 80 | 50/10000 | 55 | |
| 5 | C | 0.02–0.3 | 3000 | 0.90 | yes | 20 | 35/10000 | 40 | |
| 6* | A | 0.02–0.2 | 2000 | 0.65 | yes | 10 | 20/10000 | 35 | |
| 7* | A | 0.02–0.2 | 2000 | 0.50 | no | 35 | 120/10000 | 40 | |
| 8* | A | 0.02–0.2 | 2000 | 0.05 | no | 15 | 80/10000 | 40 | |
| 9* | B | 0.01 | 150 | 0.60 | yes | 50 | 50/10000 | 55 | |
| 10* | A | 0.02–0.2 | — | — | | 30 | 1/10000 | 45 | |
| 11* | A | 0.02–0.2 | 2000 | 0.50 | yes | 150 | 60/10000 | 45 | |
| 12* | — | 0 | 0 | 2.8 | yes | 30 | | 50 | |

| Sample No. | Electrolytic chromate treatment Electrolytic conditions | Dissolution | $Cr^M$ (mg/m$^2$) | $Cr^{OX}$ (mg/m$^2$) | Weldability | Corrosion resistance | Appearance |
|---|---|---|---|---|---|---|---|
| 1 | 15 A/dm$^2$ × 0.3 sec | no | 5 | 5 | good | good | good |
| 2 | 10 A/dm$^2$ × 0.4 sec | yes | 6 | 5 | good | good | good |
| 3 | 20 A/dm$^2$ × 0.2 sec | no | 7 | 9 | good | good | good |
| 4 | 30 A/dm$^2$ × 0.2 sec | yes | 9 | 6 | good | good | good |
| 5 | 10 A/dm$^2$ × 0.5 sec | yes | 3 | 17 | good | good | good |
| 6* | 10 A/dm$^2$ × 0.6 sec | yes | 2 | 25 | poor | good | good |
| 7* | 20 A/dm$^2$ × 0.2 sec | no | 6 | 7 | good | poor | good |
| 8* | 10 A/dm$^2$ × 0.4 sec | yes | 5 | 6 | poor | poor | good |
| 9* | 30 A/dm$^2$ × 0.2 sec | no | 7 | 8 | good | poor | good |
| 10* | 10 A/dm$^2$ × 0.5 sec | no | 0 | 18 | good | poor | good |
| 11* | 30 A/dm$^2$ × 0.1 sec | no | 5 | 4 | good | good | poor |
| 12* | 5 A/dm$^2$ × 1 sec | no | 0 | 6 | good | good | good |

*comparative examples
**$Cr^M$: metallic chromium
$Cr^{OX}$: hydrated chromium oxides
Corrosion resistance: corrosion resistance after lacquering For comparative sample Nos. 6–12, those figures not satisfying the requirements of the present invention are underlined in Table 1. As seen from the results of weldability and corrosion resistance after lacquering of surface-treated steel samples shown in Table 1, sample Nos. 1 to 5 satisfying all the requirements of the invention exhibit superior weldability and corrosion resistance after lacquering as compared with, for example, sample No. 12 corresponding to #25 tinplate although the amount of tin plated is less than one third of that of sample No. 12. These improvements are based on the surface structure of multi-layer construction comprising the first layer of iron-nickel alloy, the second layer of iron-tin-nickel alloy, and the third layer formed by a proper chromate treatment in a controlled bath.

Conversely, comparative samples which do not satisfy at least one of the required parameters of the present invention are inferior to the sample of the invention in weldability and/or corrosion resistance.

As seen from the above example, since the surface-treated steel strip or sheet suitable for electric resistance welding according to the present invention is prepared by forming a first layer of iron-nickel alloy on a steel strip, depositing tin on the first layer, optionally causing the tin to reflow to form a second layer of iron-tin-nickel alloy, and effecting an electrolytic chromate treatment to form a third chromated layer on the second layer, thereby forming a surface structure of multi-layer construction while specifically controlling the composition and thickness of the first layer, the build-ups of the second and third layers, and the composition of the chromate treating bath, weldability and corrosion resistance after lacquering are significantly improved as well as the adhesion of a lacquer film to the steel. Thus, the surface-treated steel strip or sheet according to the present invention satisfies all the above-mentioned requirements for steel material from which welded food cans are formed.

What is claimed is:

1. Process for preparing a surface-treated steel strip adapted for electric resistance welding, comprising the steps of
    forming a first layer of iron-nickel alloy on a steel strip, said first layer having a weight ratio of Ni/(Fe+Ni) in the range between 0.02 and 0.50 and a thickness of 10 to 5,000 angstroms,
    forming a second layer of tin on said first layer by tin plating to a coating weight of 0.1 to 1 g/m$^2$ of tin, and
    forming a third layer on said second layer by effecting an electrolytic chromate treatment, said third layer consisting essentially of metallic chromium and hydrated chromium oxide, said third layer having the composition $2 \leq x$ and $5 \leq x+y \leq 20$ in which x is the amount of metallic chromium in the third layer and y is the amount of hydrated chromium oxide in the third layer calculated as elemental chromium, both expressed in mg per square meter,
    characterized in that the electrolytic chromate treatment is carried out in a bath which contains an amount of CrO$_3$ to give 10 to 100 g/l of CrO$_3$ and has a weight ratio of H$_2$SO$_4$/CrO$_3$ in the range between 3/1000 and 1/100.

2. Process for preparing a surface-treated steel strip adapted for electric resistance welding, comprising the steps of
    forming a first layer of iron-nickel alloy on a steel strip, said first layer having a weight ratio of Ni/(Fe+Ni) in the range between 0.02 and 0.50 and a thickness of 10 to 5,000 angstroms,
    plating tin on said first layer to a coating weight of 0.1 to 1 g/m$^2$ of tin,
    causing the tin to reflow to form a second layer of iron-tin-nickel alloy on said first layer, and forming a third layer on said second layer by effecting an electrolytic chromate treatment, said third layer consisting essentially of metallic chromium and hydrated chromium oxide, said third layer having the composition $2 \leq x$ and $5 \leq x+y \leq 20$ in which x is the amount of metallic chromium in the third layer and y is the amount of hydrated chromium oxide in the third layer calculated as elemental chromium, both expressed in mg per square meter, characterized in that the electrolytic chromate treatment is carried out in a bath which contains an amount of $CrO_3$ to give 10 to 100 g/l of $CrO_3$ and has a weight ratio of $H_2SO_4/CrO_3$ in the range between 3/1000 and 1/100.